United States Patent
Maier et al.

(10) Patent No.: US 12,024,165 B2
(45) Date of Patent: Jul. 2, 2024

(54) EVALUATION APPARATUS FOR EVALUATING A TRAJECTORY HYPOTHESIS FOR A VEHICLE

(71) Applicant: Knorr-Bremse Systeme Fuer Nutzfahrzeuge GmbH, Munich (DE)

(72) Inventors: Oliver Maier, Stuttgart (DE); Andreas Nohl, Knittlingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 254 days.

(21) Appl. No.: 17/713,615

(22) Filed: Apr. 5, 2022

(65) Prior Publication Data

US 2022/0348194 A1 Nov. 3, 2022

(30) Foreign Application Priority Data

Apr. 28, 2021 (EP) .................................... 21170955

(51) Int. Cl.
- *B60W 30/09* (2012.01)
- *B60W 30/095* (2012.01)
- *B60W 40/10* (2012.01)
- *B60W 60/00* (2020.01)

(52) U.S. Cl.
CPC ........ *B60W 30/0953* (2013.01); *B60W 40/10* (2013.01); *B60W 60/0015* (2020.02); *B60W 2540/18* (2013.01)

(58) Field of Classification Search
CPC ....... B60W 2520/105; B60W 2540/18; B60W 30/09; B60W 30/095; B60W 30/0953; B60W 30/10; B60W 40/10; B60W 60/0011; B60W 60/0015
See application file for complete search history.

(56) References Cited

U.S. PATENT DOCUMENTS

| | | | |
|---|---|---|---|
| 8,892,356 B1 * | 11/2014 | Weiland | B60W 50/14 701/454 |
| 9,610,945 B2 | 4/2017 | Miller et al. | |
| 9,731,735 B1 * | 8/2017 | Nishinaga | B61L 15/0072 |
| 10,671,076 B1 * | 6/2020 | Kobilarov | G08G 1/166 |
| 11,794,732 B2 * | 10/2023 | Poubel Orenstein | B60W 60/00276 |

(Continued)

FOREIGN PATENT DOCUMENTS

DE 102013005362 A1 10/2013

OTHER PUBLICATIONS

Extended European Search Report issued Oct. 28, 2021 in connection with European Application No. 21170955.5.

*Primary Examiner* — Tyler J Lee
(74) *Attorney, Agent, or Firm* — NORTON ROSE FULBRIGHT US LLP; Gerard A. Messina

(57) ABSTRACT

An evaluation apparatus for evaluating a predefined trajectory hypothesis for a vehicle includes a calculation unit, a detection unit and an assigning unit. The calculation unit is configured to calculate at least one necessary driving parameter for the vehicle to follow the predefined trajectory hypothesis. The detection unit is configured to detect a current driving parameter of the vehicle. The assigning unit is configured to assign a probability value for the vehicle to follow the predefined trajectory hypothesis using the current driving parameter and the necessary driving parameter.

13 Claims, 2 Drawing Sheets

(56) References Cited

U.S. PATENT DOCUMENTS

| | | | |
|---|---|---|---|
| 2010/0131142 A1* | 5/2010 | Deng | B60T 7/18 |
| | | | 701/65 |
| 2010/0191391 A1* | 7/2010 | Zeng | G01S 13/87 |
| | | | 701/1 |
| 2014/0257593 A1* | 9/2014 | Igarashi | G06V 20/58 |
| | | | 701/1 |
| 2015/0232104 A1* | 8/2015 | Sudou | B60W 30/16 |
| | | | 701/1 |
| 2016/0362104 A1 | 12/2016 | Miller et al. | |
| 2018/0141544 A1* | 5/2018 | Xiao | G06Q 30/0266 |
| 2019/0135279 A1* | 5/2019 | Irie | B60W 30/16 |
| 2019/0152490 A1* | 5/2019 | Lan | G06V 20/58 |
| 2019/0243371 A1* | 8/2019 | Nister | G05D 1/0223 |
| 2020/0189575 A1 | 6/2020 | Wongpiromsarn et al. | |
| 2020/0387156 A1* | 12/2020 | Xu | B60W 60/0051 |
| 2021/0001860 A1* | 1/2021 | Kawasaki | B60W 30/09 |
| 2021/0046923 A1 | 2/2021 | Olson et al. | |
| 2021/0046926 A1* | 2/2021 | Olson | B60W 60/0011 |
| 2021/0048817 A1* | 2/2021 | Olson | B60W 40/114 |
| 2021/0048818 A1* | 2/2021 | Funke | B60W 30/09 |
| 2022/0135029 A1* | 5/2022 | Poubel Orenstein | G08G 1/163 |
| | | | 701/301 |
| 2022/0289232 A1* | 9/2022 | Hagvall | G06F 17/18 |
| 2022/0315037 A1* | 10/2022 | Wankhede | G06V 10/761 |
| 2022/0355800 A1* | 11/2022 | Miyazaki | B60W 60/001 |

\* cited by examiner

EVALUATION APPARATUS FOR EVALUATING A TRAJECTORY HYPOTHESIS FOR A VEHICLE

RELATED APPLICATION INFORMATION

The present application claims priority to and the benefit of European patent application no. 21170955.5, which was filed in Europe on Apr. 28, 2021, the disclosure which is incorporated herein by reference.

FIELD OF THE INVENTION

The present invention relates to an evaluation apparatus for evaluating a trajectory hypothesis for a vehicle, to a vehicle with said evaluation apparatus, and to a method of controlling an evaluation apparatus for a vehicle.

BACKGROUND INFORMATION

For driver assistant systems, the driver partially or mainly defines the future state of the ego vehicle. To make decisions, those systems consider one or more hypotheses of the predicted vehicle state for a certain prediction time period.

Patent document U.S. Pat. No. 9,610,945 B2 discusses a system for identifying an intersection of a host vehicle and a target vehicle. Data relating to the target vehicle are collected. A map of a surrounding environment is developed. A driver intent probability is determined based at least in part on the map. A threat estimation is determined based at least in part on the driver intent probability. At least one of a plurality of safety systems is activated based at least in part on the threat estimation.

SUMMARY OF THE INVENTION

Against this background, it is the object of the present invention to provide an improved evaluation apparatus for evaluating a trajectory hypothesis for a vehicle, an improved vehicle with said evaluation apparatus, and an improved method of controlling an evaluation apparatus for a vehicle.

This object may be achieved by an evaluation apparatus for evaluating a trajectory hypothesis for a vehicle, by a vehicle with said evaluation apparatus, and by a method of controlling an evaluation apparatus for a vehicle according to the main claims.

Advantageously, a probability value for the vehicle to follow a predefined trajectory hypothesis can be evaluated, wherein the probability value, according to embodiments, afterwards can be used by a driver assistant system of the vehicle, for example to predict a possible collision of the vehicle with an object or further vehicle.

An evaluation apparatus for evaluating a predefined trajectory hypothesis for a vehicle comprises a calculation unit, a detection unit and an assigning unit. The calculation unit is configured to calculate at least one necessary driving parameter for the vehicle to follow the predefined trajectory hypothesis. The detection unit is configured to detect a current driving parameter of the vehicle. The assigning unit is configured to assign a probability value for the vehicle to follow the predefined trajectory hypothesis using the current driving parameter and the necessary driving parameter.

The vehicle may be a utility vehicle or commercial vehicle, for example a truck, bus or the like. The evaluation apparatus may be configured to receive at least the predefined trajectory hypothesis or several different predefined trajectory hypotheses from a determining unit that may be configured to determine at least the predefined trajectory hypothesis for the vehicle using for example at least a sensor information of the vehicle, a driver monitoring information and/or an observed environmental information. The predefined trajectory hypothesis may be a possible trajectory to be followed by the vehicle out of a set of several possible trajectories. The necessary driving parameter may be a subsequent driving parameter which necessarily needs to be actuated in order to control the vehicle to follow the predefined trajectory hypothesis. The necessary driving parameter may be an actuation value or control value of a vehicle setting unit of the vehicle. The current driving parameter may be an actuation value or control value which is actually actuated. The current driving parameter may be an actuation value or control value of the same vehicle setting unit of the vehicle, so that the current driving parameter and the necessary driving parameter may be comparable driving parameters. The assigning unit may be configured to assign the probability value for the vehicle to follow the predefined trajectory hypothesis using a result of a comparison between the current driving parameter and the necessary driving parameter.

According to an embodiment, the calculation unit may be configured to calculate at least a second necessary driving parameter for the vehicle to follow a second predefined trajectory hypothesis, wherein the assigning unit is configured to assign a second probability value for the vehicle to follow the second predefined trajectory hypothesis using the current driving parameter and the second necessary driving parameter. Such an embodiment offers the advantage of calculating a second probability value for a second predefined trajectory hypothesis. According to an embodiment, the probability value and the second probability value may be compared to determine which of the two predefined trajectory hypotheses may be the one that might be chosen more likely to be followed.

According to an embodiment, the assigning unit may be configured to assign a higher probability value for the vehicle to follow the predefined trajectory hypothesis than for the vehicle to follow the second predefined trajectory hypothesis if the current driving parameter resembles the necessary driving parameter more than the second necessary driving parameter and/or wherein the assigning unit is configured to assign a higher second probability value for the vehicle to follow the second predefined trajectory hypothesis than for the vehicle to follow the predefined trajectory hypothesis if the current driving parameter resembles the second necessary driving parameter more than the necessary driving parameter. According to an embodiment, the higher probability value for the vehicle to follow the predefined trajectory hypothesis may be assigned if the difference between the current driving parameter and the necessary driving parameter is lower than the difference between the current driving parameter and the second necessary driving parameter. According to an embodiment, the higher second probability value for the vehicle to follow the second predefined trajectory hypothesis may be assigned if the difference between the current driving parameter and the second necessary driving parameter is lower than the difference between the current driving parameter and the necessary driving parameter.

According to an embodiment, the calculation unit may be configured to calculate the necessary driving parameter as a necessary steering wheel angle and/or a necessary acceleration for the vehicle to follow the predefined trajectory hypothesis and/or the detection unit may be configured to detect the current driving parameter as an actuated steering wheel angle and/or an actuated acceleration of the vehicle. Such driving parameters may be compared easily.

According to an embodiment, the evaluation apparatus may comprise a determining unit wherein the determining unit is configured to determine at least the one predefined trajectory hypothesis for the vehicle using at least a sensor information of the vehicle, a driver monitoring information and/or an observed environmental information. According to an embodiment, the sensor information of the vehicle may represent a yaw rate of the vehicle and/or a vehicle velocity of the vehicle. For example, boundaries of the current vehicle lane may serve as a source to predict the predefined trajectory hypothesis. Advantageously, the predefined trajectory hypothesis for the vehicle may be determined by considering actual driving information.

According to an embodiment, the evaluation apparatus may comprise a collision calculation unit, wherein the collision calculation unit is configured to calculate a collision possibility value for a collision of the vehicle with an object or further vehicle using the probability value. According to an embodiment, the collision calculation unit may be configured to calculate the collision possibility value for the collision of the vehicle with the object or further vehicle on the predefined trajectory hypothesis using the probability value. Such a collision possibility value can be used in order to avoid the possible collision. The collision calculation unit may enhance a safety of the vehicle.

According to an embodiment, the collision calculation unit may be configured to calculate a collision avoidance maneuver for adapting the predefined trajectory hypothesis using the collision possibility value. By adapting the predefined trajectory hypothesis, the collision may advantageously be avoided.

According to an embodiment, the evaluation apparatus may furthermore comprise a selection unit, wherein the selection unit is configured to select the predefined trajectory hypothesis as a predicted trajectory for the vehicle to follow if the probability value reaches or exceeds a defined probability value or comprises the highest probability value out of several assigned probability values for several different predefined trajectory hypotheses. Advantageously, the predefined trajectory hypothesis may be selected as the predicted trajectory, which may be chosen by for example a driver of the vehicle to follow most likely.

According to an embodiment, the selection unit may be configured to provide a control signal for a control unit of the vehicle, wherein the control signal is configured to control the vehicle in order to follow the predicted trajectory. Such a control signal can be used to control the vehicle autonomously.

According to an embodiment, the evaluation apparatus may comprise the control unit, wherein the control unit is configured to control the vehicle in order to follow the predicted trajectory using the control signal.

According to an embodiment, the assigning unit may be configured to assign the probability value as a function of the deviation of the necessary driving parameter and the current driving parameter and/or at least one previous driving parameter of the vehicle actuated prior to the current driving parameter and/or at least one previous necessary driving parameter of the vehicle calculated prior to the necessary driving parameter.

A vehicle comprises an embodiment of an aforementioned evaluation apparatus. The vehicle may be a utility vehicle or commercial vehicle, for example a truck, bus or the like.

A method of controlling an aforementioned evaluation apparatus comprises:

calculating at least one necessary driving parameter for the vehicle to follow a predefined trajectory hypothesis; detecting a current driving parameter of the vehicle; and assigning a probability value for the vehicle to follow the predefined trajectory hypothesis using the current driving parameter and the necessary driving parameter.

The method or the steps of the method may be executed using an aforementioned evaluation apparatus.

What is also advantageous is a computer program product having program code which may be stored on a machine-readable carrier, such as semiconductor memory, hard disk or optical memory, and is used for performing the method one of the previously described embodiments, when the program product is executed on a computer or an apparatus.

Embodiments of the approach presented here shall be explained in greater detail in the subsequent description with reference to the figures.

In the following description of advantageous embodiments of the present invention, the same or similar reference numerals shall be used for the elements depicted in the various figures and acting in a similar way, wherein repeated description of these elements shall be omitted.

DETAILED DESCRIPTION

Figure 1:
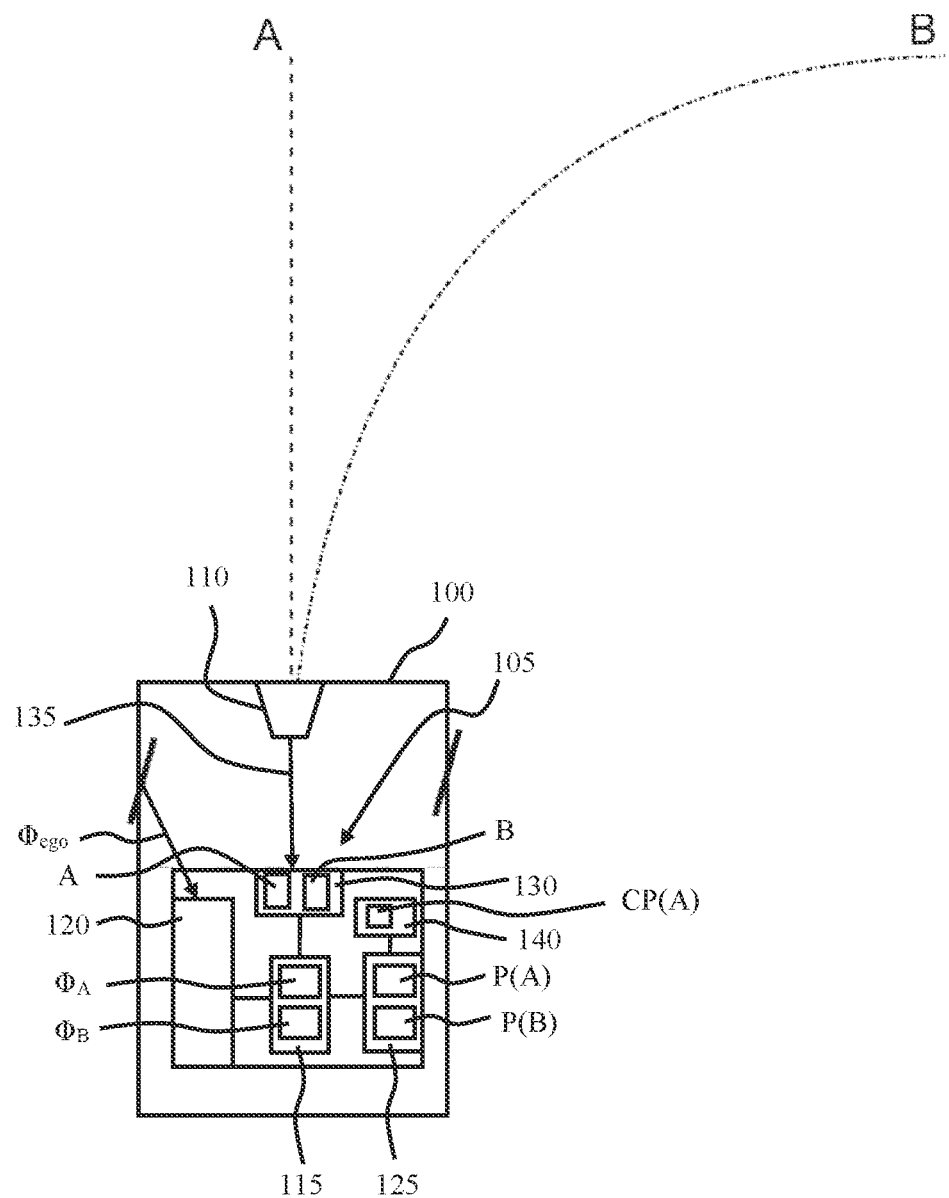
FIG. 1 shows a schematic illustration of a vehicle comprising an evaluation apparatus according to an embodiment of the present invention for evaluating a predefined trajectory hypothesis.

FIG. 1 shows a schematic illustration of a vehicle 100 comprising an evaluation apparatus 105 according to an embodiment of the present invention for evaluating a predefined trajectory hypothesis A. The vehicle 100 is a utility vehicle or commercial vehicle and/or configured as an autonomous vehicle 100 or a semi-autonomous vehicle 100. According to this embodiment, the vehicle 100 comprises at least one vehicle sensor 110.

The evaluation apparatus 105 for evaluating the predefined trajectory hypothesis A comprises a calculation unit 115, a detection unit 120 and an assigning unit 125. The calculation unit 115 is configured to calculate at least one necessary driving parameter $\phi_A$ for the vehicle 100 to follow the predefined trajectory hypothesis A. The detection unit 120 is configured to detect a current driving parameter $\phi_{ego}$ of the vehicle 100. The assigning unit 125 is configured to assign a probability value P(A) for the vehicle 100 to follow the predefined trajectory hypothesis A using the current driving parameter $\phi_{ego}$ and the necessary driving parameter $\phi_A$.

According to this embodiment, the evaluation apparatus 105 is configured to receive at least the predefined trajectory hypothesis A or several different predefined trajectory hypotheses A, B from a determining unit 130 that is configured to determine at least the predefined trajectory hypothesis A for the vehicle 100 using for example at least a sensor information 135 of the vehicle 100, a driver monitoring information and/or an observed environmental information from the vehicle sensor 110. According to an embodiment, the sensor information 135 represents a yaw rate of the vehicle 100 and/or a vehicle velocity of the vehicle 100. For example, boundaries of the current vehicle lane serve as a source to predict the predefined trajectory hypothesis A and/or a second predefined trajectory hypothesis B. According to this embodiment, the determining unit 130 is part of the evaluation apparatus 105.

The predefined trajectory hypothesis A is a possible trajectory to be followed by the vehicle 100 out of a set of several possible trajectories. The necessary driving parameter $\phi_A$ is a subsequent driving parameter which necessarily needs to be actuated in order to control the vehicle 100 to follow the predefined trajectory hypothesis A. The necessary driving parameter $\phi_A$ represents for example an actuation value or control value of a vehicle setting unit of the vehicle 100. The current driving parameter $\phi_{ego}$ represents an actuation value or control value which is actually actuated. The current driving parameter $\phi_{ego}$ represents an actuation value or control value of the same vehicle setting unit of the vehicle 100, so that the current driving parameter $\phi_{ego}$ and the necessary driving parameter $\phi_A$ are comparable driving parameters. According to an embodiment, the assigning unit 125 is configured to assign the probability value P(A) for the vehicle 100 to follow the predefined trajectory hypothesis A using a result of a comparison between the current driving parameter $\phi_{ego}$ and the necessary driving parameter $\phi_A$.

According to this embodiment, the calculation unit 115 is configured to calculate at least a second necessary driving parameter $\phi_B$ for the vehicle 100 to follow a second predefined trajectory hypothesis B; wherein the assigning unit 125 is configured to assign a second probability value P(B) for the vehicle 100 to follow the second predefined trajectory hypothesis B using the current driving parameter $\phi_{ego}$ and the second necessary driving parameter $\phi_B$.

According to this embodiment, the assigning unit 125 is configured to assign a higher probability value P(A) for the vehicle 100 to follow the predefined trajectory hypothesis A than for the vehicle 100 to follow the second predefined trajectory hypothesis B if the current driving parameter $\phi_{ego}$ resembles the necessary driving parameter $\phi_A$ more than the second necessary driving parameter $\phi_B$ and/or wherein the assigning unit 125 is configured to assign a higher second probability value P(B) for the vehicle 100 to follow the second predefined trajectory hypothesis B than for the vehicle 100 to follow the predefined trajectory hypothesis A if the current driving parameter $\phi_{ego}$ resembles the second necessary driving parameter $\phi_B$ more than the necessary driving parameter $\phi_A$. According to this embodiment, the higher probability value P(A) for the vehicle 100 to follow the predefined trajectory hypothesis A is assigned if the difference between the current driving parameter $\phi_{ego}$ and the necessary driving parameter $\phi_A$ is lower than the difference between the current driving parameter $\phi_{ego}$ and the second necessary driving parameter $\phi_B$. According to another embodiment, the higher second probability value P(B) for the vehicle 100 to follow the second predefined trajectory hypothesis B is assigned if the difference between the current driving parameter $\phi_{ego}$ and the second necessary driving parameter $\phi_B$ is lower than the difference between the current driving parameter $\phi_{ego}$ and the necessary driving parameter $\phi_A$.

According to this embodiment, the calculation unit 115 is configured to calculate the necessary driving parameter $\phi_A$ as a necessary steering wheel angle and/or a necessary acceleration for the vehicle 100 to follow the predefined trajectory hypothesis A and/or the detection unit 120 is configured to detect the current driving parameter $\phi_{ego}$ as an actuated steering wheel angle and/or an actuated acceleration of the vehicle 100.

According to this embodiment, the evaluation apparatus 100 furthermore comprises a collision calculation unit 140, wherein the collision calculation unit 140 is configured to calculate a collision possibility value CP(A) for a collision of the vehicle 100 with an object or further vehicle using the probability value P(A). According to an embodiment, the collision calculation unit 140 is configured to calculate the collision possibility value CP(A) for the collision of the vehicle 100 with the object or further vehicle or further vehicle on the predefined trajectory hypothesis A using the probability value P(A). According to this embodiment, the collision calculation unit 140 is configured to calculate a second collision possibility value for a collision of the vehicle 100 with an object or further vehicle using the probability value P(B). According to an embodiment, the collision calculation unit 140 is configured to calculate the second collision possibility value for the collision of the vehicle 100 with the object or further vehicle on the second predefined trajectory hypothesis B using the probability value P(B).

According to this embodiment, the collision calculation unit 140 is configured to calculate a collision avoidance maneuver for adapting the predefined trajectory hypothesis A using the collision possibility value CP(A). According to an embodiment, the collision calculation unit 140 is furthermore configured to calculate a second collision avoidance maneuver for adapting the second predefined trajectory hypothesis B using the second collision possibility value.

According to an embodiment, the evaluation apparatus 100 furthermore comprises a selection unit, wherein the selection unit is configured to select the predefined trajectory hypothesis A as a predicted trajectory for the vehicle 100 to follow if the probability value P(A) reaches or exceeds a defined probability value or comprises the highest probability value out of several assigned probability values for several different predefined trajectory hypotheses A, B. According to an embodiment, the selection unit is configured to select the second predefined trajectory hypothesis B as the predicted trajectory for the vehicle 100 to follow if the second probability value P(B) reaches or exceeds a defined probability value or comprises the highest probability value out of several assigned probability values for several different predefined trajectory hypotheses A, B. According to an embodiment, the selection unit is configured to provide a control signal for a control unit of the vehicle 100, wherein the control signal is configured to control the vehicle 100 in order to follow the predicted trajectory.

According to an embodiment, the evaluation apparatus 100 comprises the control unit that is configured to control the vehicle 100 in order to follow the predicted trajectory using the control signal.

According to an embodiment, the assigning unit 125 is configured to assign the probability value P(A) as a function of the deviation of the necessary driving parameter $\phi_A$ and the current driving parameter $\phi_{ego}$ and/or at least one previous driving parameter of the vehicle 100 actuated prior to the current driving parameter $\phi_{ego}$ and/or at least one previous necessary driving parameter of the vehicle 100 calculated prior to the necessary driving parameter $\phi_A$. Examples for assigning the probability value P(A) and the second probability value P(B) are shown above:

$$P(A)=f(|\phi_{ego}-\phi_A|)$$

$$P(B)=f(|\phi_{ego}-\phi_B|)$$

In other words, FIG. 1 shows an architecture of an evaluation apparatus 105, which enables the usage of control values to estimate the probability of trajectory hypotheses A, B which may also be referred to as "ego motion trajectories" or "ego vehicle trajectories".

According to an embodiment, the evaluation apparatus 105 is integrated or implemented into a driver assistant system of the vehicle 100, such as ACC (Adaptive Cruise Control), AEBS (Advanced Emergency Braking System) or PAEBS. For such driver assistant systems, the driver of the vehicle 100 partially or mainly defines the future state of the ego vehicle 100. To make decisions, those systems consider one or more trajectory hypotheses A, B of the predicted vehicle state for a certain prediction time period.

According to an embodiment, the hypothesis A, B of the future vehicle state for the predicted time period (ego vehicle trajectory) is estimated using different sources, such as sensor information 135 within the ego vehicle 100, driver monitoring information and/or observed environmental information. For example, if available, the boundaries of the current vehicle lane, is a source to predict the future vehicle trajectory. Another source is the current state of the vehicle dynamics, such as yaw rate and vehicle velocity. To make a decision based on the ego vehicle trajectory for each of the hypotheses A, B, a certain probability of occurrence is assigned/estimated by the assigning unit 125. According to an embodiment, based on the probability for example the trajectory hypothesis A, B with the highest probability is selected or the probability for each hypotheses A, B is considered directly when making decisions.

In the context of automated driving, control algorithms are used, to calculate the necessary actuation values, e. g. steering wheel angle, acceleration demand, . . . , based on a predicted trajectory.

Here, a basic idea is to use the actuation value of an autonomous vehicle controller in order to estimate the probability if the driver will follow a certain trajectory hypothesis A, B. In order to estimate the probability of occurrence, this functionality is applied to different ego vehicle trajectories A, B. For each of the trajectories A, B . . . the actuation values are calculated, that a control algorithm of an automated vehicle 100 would choose in order to follow the specific trajectory ($\phi_A$, $\phi_B$, . . . ). According to an embodiment, afterward, the estimated actuation value is compared to the actual actuation value.

According to an embodiment, the probability of occurrence of each of the ego vehicle trajectories A, B is calculated as a function of the deviation of the estimated actuation value and the actual actuation value and their values from the previous time step.

According to an embodiment, the probability of occurrence is then used in order to estimate the collision probability for the specific ego vehicle trajectory A, B, which afterwards can be used for e. g. collision avoidance maneuvers.

Figure 2:
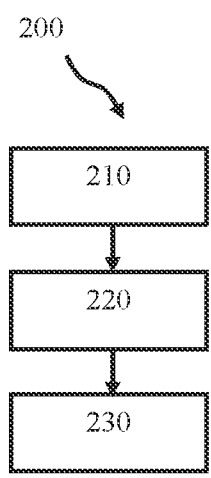
FIG. 2 shows a flowchart of a method of controlling an evaluation apparatus according to an embodiment of the present invention.

FIG. 2 shows a flowchart of a method 200 of controlling an evaluation apparatus according to an embodiment of the present invention. The method 200 is executable by the evaluation apparatus as described with reference to FIG. 1 or a similar evaluation apparatus.

The method 200 of controlling comprises a step 210 of calculating at least one necessary driving parameter for the vehicle to follow a predefined trajectory hypothesis. The method 200 of controlling furthermore comprises a step 220 of detecting a current driving parameter of the vehicle. Furthermore, the method 200 of controlling comprises a step 230 of assigning a probability value for the vehicle to follow the predefined trajectory hypothesis using the current driving parameter and the necessary driving parameter.

THE REFERENCE NUMERAL LIST IS AS FOLLOWS $\phi_A$ necessary driving parameter
$\phi_B$ second necessary driving parameter
$\phi_{ego}$ current driving parameter
A predefined trajectory thesis
B second predefined trajectory thesis
CP(A) collision possibility value
P(A) probability value
P(B) second probability value
100 vehicle
105 evaluation apparatus
110 vehicle sensor
115 calculation unit
120 detection unit
125 assigning unit
130 determining unit
135 sensor information
140 collision calculation unit
200 method of controlling an evaluation apparatus for a vehicle
210 step of calculating
220 step of detecting
230 step of assigning

What is claimed is:

1. An evaluation apparatus for a vehicle having a driver assistant system for evaluating a predefined trajectory hypothesis for the vehicle, comprising:
   a calculation unit to calculate at least one necessary driving parameter for the vehicle to follow the predefined trajectory hypothesis;
   a detection unit to detect a current driving parameter of the vehicle;
   an assigning unit to assign a probability value for the vehicle to follow the predefined trajectory hypothesis using the current driving parameter and the at least one necessary driving parameter; and
   a selection unit to select the predefined trajectory hypothesis as a predicted trajectory for the vehicle to follow when the probability value is at least a defined probability value or includes a maximum probability value out of assigned probability values for different predefined trajectory hypotheses;
   wherein the driver assistant system uses the at least one necessary driving parameter, which is an actuation value or a control value of a vehicle setting unit, to control the vehicle setting unit and the vehicle.

2. The evaluation apparatus of claim 1, wherein the calculation unit is configured to calculate at least a second necessary driving parameter for the vehicle to follow a predefined second predefined trajectory hypothesis, and wherein the assigning unit is configured to assign a second probability value for the vehicle to follow the second predefined trajectory hypothesis using the current driving parameter and the second necessary driving parameter.

3. The evaluation apparatus of claim 2, wherein the assigning unit is configured to assign a higher probability value for the vehicle to follow the predefined trajectory hypothesis than for the vehicle to follow the second predefined trajectory hypothesis when the current driving parameter resembles the necessary driving parameter more than the second necessary driving parameter, and/or wherein the assigning unit is configured to assign a higher second probability value for the vehicle to follow the second predefined trajectory hypothesis than for the vehicle to follow the predefined trajectory hypothesis when the current driving parameter resembles the second necessary driving parameter more than the necessary driving parameter.

4. The evaluation apparatus of claim 1, wherein the calculation unit is configured to calculate the necessary driving parameter as a necessary steering wheel angle and/or a necessary acceleration for the vehicle to follow the predefined trajectory hypothesis and/or the detection unit is configured to detect the current driving parameter as an actuated steering wheel angle and/or an actuated acceleration of the vehicle.

5. The evaluation apparatus of claim 1, further comprising:
a determining unit to determine at least the one predefined trajectory hypothesis for the vehicle using at least a sensor information of the vehicle and at least one of a driver monitoring information and an observed environmental information.

6. The evaluation apparatus of claim 1, further comprising:
a collision calculation unit to calculate a collision possibility value for a collision of the vehicle with an object or further vehicle using the probability value.

7. The evaluation apparatus of claim 6, wherein the collision calculation unit is configured to calculate a collision avoidance maneuver for adapting the predefined trajectory hypothesis using the collision possibility value.

8. The evaluation apparatus of claim 1, further comprising:
a selection unit to select the predefined trajectory hypothesis as a predicted trajectory for the vehicle to follow when the probability value reaches or exceeds a defined probability value or comprises the highest probability value out of several assigned probability values for several different predefined trajectory hypotheses.

9. The evaluation apparatus of claim 1, wherein the assigning unit is configured to assign the probability value as a function of the deviation of the necessary driving parameter and the current necessary driving parameter, and/or at least one previous necessary driving parameter of the vehicle actuated prior to the current necessary driving parameter, and/or at least one previous necessary driving parameter of the vehicle calculated prior to the necessary driving parameter.

10. A vehicle having a driver assistant system, comprising:
an evaluation apparatus for evaluating a predefined trajectory hypothesis for the vehicle, including:
a calculation unit to calculate at least one necessary driving parameter for the vehicle to follow the predefined trajectory hypothesis;
a detection unit to detect a current driving parameter of the vehicle;
an assigning unit to assign a probability value for the vehicle to follow the predefined trajectory hypothesis using the current driving parameter and the at least one necessary driving parameter; and
a selection unit to select the predefined trajectory hypothesis as a predicted trajectory for the vehicle to follow when the probability value is at least a defined probability value or includes a maximum probability value out of assigned probability values for different predefined trajectory hypotheses;
wherein the driver assistant system uses the at least one necessary driving parameter, which is an actuation value or a control value of a vehicle setting unit, to control the vehicle setting unit and the vehicle.

11. A method of controlling an evaluation apparatus for evaluating a predefined trajectory hypothesis for a vehicle having a driver assistant system, the method comprising:
calculating, via a calculation unit of the evaluation apparatus, at least one necessary driving parameter for the vehicle to follow the predefined trajectory hypothesis;
detecting, via a detection unit of the evaluation apparatus, a current driving parameter of the vehicle;
assigning, via an assigning unit of the evaluation apparatus, a probability value for the vehicle to follow the predefined trajectory hypothesis using the at least one current driving parameter and the necessary driving parameter; and
selecting, via a selection unit, the predefined trajectory hypothesis as a predicted trajectory for the vehicle to follow when the probability value is at least a defined probability value or includes a maximum probability value out of assigned probability values for different predefined trajectory hypotheses;
wherein the driver assistant system uses the at least one necessary driving parameter, which is an actuation value or a control value of a vehicle setting unit, to control the vehicle setting unit and the vehicle.

12. A non-transitory computer readable medium having a computer program, which is executable by a processor, comprising:
a program code arrangement having program code for controlling an evaluation apparatus of a vehicle having a driver assistant system, the evaluation apparatus including a calculation unit, a detection unit, and an assigning unit, by performing the following:
calculating, via the calculation unit, at least one necessary driving parameter for the vehicle to follow a predefined trajectory hypothesis;
detecting, via the detection unit, a current driving parameter of the vehicle;
assigning, via the assigning unit, a probability value for the vehicle to follow the predefined trajectory hypothesis using the current driving parameter and the necessary driving parameter; and
selecting, via a selection unit, the predefined trajectory hypothesis as a predicted trajectory for the vehicle to follow when the probability value is at least a defined probability value or includes a maximum probability value out of assigned probability values for different predefined trajectory hypotheses;
wherein the driver assistant system uses the at least one necessary driving parameter, which is an actuation value or a control value of a vehicle setting unit, to control the vehicle setting unit and the vehicle.

13. The computer readable medium of claim 12, wherein at least a second necessary driving parameter is calculated for the vehicle to follow a predefined second predefined trajectory hypothesis, and wherein the assigning includes assigning a second probability value for the vehicle to follow the second predefined trajectory hypothesis using the current driving parameter and the second necessary driving parameter.

* * * * *